United States Patent [19]

Chadwick et al.

[11] Patent Number: 5,442,646
[45] Date of Patent: Aug. 15, 1995

[54] SUBCARRIER COMMUNICATION SYSTEM

[75] Inventors: David J. Chadwick, Great Falls, Va.; Howard H. Ma, Lexington, Mass.; Frank J. Mammano, Forestville, Md.; James W. Marshall, Sterling, Va.; Vijaykumar M. Patel, Fairfax, Va.; Lyle G. Saxton, Broad Run, Va.

[73] Assignee: The Mitre Corporation, Bedford, Mass.

[21] Appl. No.: 189,715

[22] Filed: Feb. 1, 1994

[51] Int. Cl.[6] .................. H04B 1/10; H04B 15/00; H04L 1/20; H04L 1/00
[52] U.S. Cl. ................................. 371/43; 371/45; 375/296; 375/331; 375/346; 455/45; 455/65
[58] Field of Search .............. 371/43, 44, 45; 375/60, 375/85, 99; 455/45, 65

[56] References Cited

U.S. PATENT DOCUMENTS

| | | | |
|---|---|---|---|
| 4,217,660 | 8/1980 | En | 371/44 |
| 4,644,347 | 2/1987 | Lucas et al. | 340/825.04 |
| 4,646,290 | 2/1987 | Hills | 370/84 |
| 4,897,835 | 1/1990 | Gaskill et al. | 370/94.1 |
| 5,138,457 | 8/1992 | Sakai et al. | 358/196 |
| 5,263,052 | 11/1993 | Borth et al. | 375/39 |
| 5,283,780 | 2/1994 | Schuchman et al. | 370/50 |
| 5,301,209 | 4/1994 | Wei | 375/39 |
| 5,315,583 | 5/1994 | Murphy et al. | 370/18 |

Primary Examiner—Stephen M. Baker
Attorney, Agent, or Firm—Morton J. Rosenberg; David I. Klein

[57] ABSTRACT

A communication system (100) is provided for transmitting data to mobile receivers utilizing a subcarrier within a commercial FM channel of a radio station (55). The data transmitted is first encoded in encoder (112), utilizing a forward error correction code. The sequence of the encoded data is altered in interleaver (116), subdivided into a plurality of subframes, in framing and synchronization circuit (120), which also adds channel state bits to each subframe. The framed data is modulated onto the subcarrier in the differential quadrature phased shift keying modulator (130), the output of which is coupled to the FM modulator (52) of radio station transmitter (50). The transmitted radio frequency signals may be received by a vehicle antenna (12) for coupling to the vehicle's FM receiver (80). The modulated subcarrier is recovered from the FM demodulator (84) of the receiver (80), the modulated subcarrier being demodulated to recover the encoded digital data therefrom. The channel state bits included with the data are extracted from the digital data and utilized to form a data reliability factor for each bit of the encoded data. The data reliability factors thus obtained are associated with each bit of the data in a deinterleaver (360). Deinterleaver (360) provides each data bit in proper sequence, with its associated data reliability factor to a decoder (370). The decoded digital data is provided to a vehicle traffic computer (90) for processing and presentation of traffic information to a user on a display (92).

34 Claims, 6 Drawing Sheets

SUBCARRIER COMMUNICATION SYSTEM

BACKGROUND OF THE INVENTION

1. Field of the Invention

This invention directs itself to communication systems for transmitting data to mobile units in a fading channel environment. In particular, this invention directs itself to a communication system utilizing a subcarrier within a commercial FM channel bandwidth utilizing in combination forward error correction coding, interleaving, and the transmission of channel state information. More in particular, this invention is directed to a communication system wherein the encoded digital data is divided into multiple frames, each frame being subdivided into a plurality of data subframes and a synchronization subframe, each subframe including a plurality of bits for establishing the reliability of the transmission channel at the mobile receiver. Further, this invention directs itself to a communication system wherein the receiver correlates received channel state bits with a sequence of bits known to have been transmitted, transforms the correlation into a metric, interpolates across, each data field to form a prequantized data reliability factor, and quantizes the interpolated factor to form a data reliability factor for each bit of data, the reliability factor for each bit being used by a Viterbi algorithm decoder subsequent to deinterleaving of the data.

2. Prior Art

Communication systems for transmitting traffic information and systems for communication in a fading channel environment are known in the art. The best prior art known to the Applicants includes the European Radio Data System (RDS) which is being deployed in Europe for dissemination of traffic-related information to motorists utilizing the existing FM radio broadcasting infrastructure. However, the RDS system is subject to serious drawbacks, such that it is Capable of running at approximately a 0.3 kilobits per second user data rate, as opposed to the instant invention which operates at an approximately 8 kilobits per second user data rate. Further, the RDS system requires the use of coding of the traffic messages to obtain an increase in apparent capacity, in addition to error correction coding, which increases equipment cost, yet still does not attain the data rate of the instant invention.

Two other traffic information systems have been recently introduced in Japan, one utilizing a subcarrier system having an 8 kilobit per second user data rate, but incorporating dynamic control of the subcarrier's injection level. The incorporation of dynamic control of the subcarrier's injection level requires more sophisticated and expensive equipment at the transmitter-end of the system and is more prone to poor performance under weak broadcast signal strength conditions. The other Japanese system developed by SEIKO TELECOMMUNICATIONS, also runs at a high data rate, but is based on a low-robustness FSK modulation, with a wide emission bandwidth. Thus, in application of this system, six to seven different FM stations are required to serve an area where only one FM station is required for the system of the instant invention.

The use of channel state information for compensation in fading channel environments is known in the art. The best prior art in this area known to the Applicants, is U.S. Pat. Nos. 4,945,549; 4,519,068; Hagenauer, J., et al., "Forward Error Correction Coding for Fading Compensation in Mobile Satellite Channels", *IEEE Journal on Selected Areas in Communications,* Vol. SAC-5, No. 2, February 1987, pp. 215-225; and, Hagenauer, J., "Viterbi Decoding of Convolutional Codes for Fading and Burst Channels," Proceedings 1980 Zurich Seminar Digital Communications, *IEEE Catalog No. 80CH* 1521-4 *Com*, pp. G2.1-G2.7. In each of the prior art references, channel state information is utilized by the decoder for soft decision making. However, such systems utilize the channel state information as an estimate of the channel state for a block of data bits, as opposed to establishing a data reliability factor for each bit. In systems such as that disclosed by U.S. Pat. No. 4,945,549, the channel state information is obtained from the power in the recovered pilot tones transmitted. Therefore, a particular sequence of bits is not added to the data stream to both precede and follow each of the data fields, whereby a data reliability factor can be established for every data bit received, as in the instant invention.

SUMMARY OF THE INVENTION

A communication system using a subcarrier within a commercial FM channel bandwidth is provided for transmitting data to mobile receivers. The communication system includes a circuit for generating a signal having a predetermined frequency defining a subcarrier signal of an FM broadcast channel for a commercial broadcast station. The communication system also includes a coding circuit for encoding digital data received at an input thereof with an error correcting code, the digital data being defined by a plurality of consecutive bits. The communication system includes a circuit coupled to the output of the coding circuit for adding a plurality of bits in a predetermined first sequence to the encoded digital data to form a digital message. A subcarrier modulator having (1) a first input coupled to an output of the circuit for adding the plurality of bits, for receiving the digital message therefrom, and (2) a second input coupled to the generating circuit for modulating the digital message on the subcarrier signal is also provided. A circuit is provided for coupling the modulated subcarrier signal to an FM transmitter of the commercial FM broadcast station for frequency modulation of the modulated subcarrier signal on a carrier signal of the FM broadcast channel. The communication system further provides for a receiving circuit for receiving the FM broadcast channel transmitted by the commercial FM broadcast station, the receiving circuit including an FM demodulator for recovering the modulated subcarrier signal from the FM modulated carrier signal. A subcarrier demodulator is also provided, the subcarrier demodulator being coupled to the FM demodulator for recovering the digital message from the modulated subcarrier signal. An extraction circuit is coupled to the subcarrier demodulator for extracting the encoded digital data from the digital message and forming a second sequence of bits therefrom. A decoding circuit coupled to the extraction circuit is provided for (1) comparing the second sequence of bits with the predetermined first sequence of bits for establishing a data reliability factor, and (2) decoding the encoded digital data in correspondence with the data reliability factor, for providing the digital data to an output thereof. A utilization device coupled to the output of the decoder circuit is provided for receiving the digital data from the decoder and operating thereon.

DESCRIPTION OF THE PREFERRED EMBODIMENT

Referring to FIGS. 1-6, there is shown communication system 100 for transmitting data to mobile receivers using a subcarrier of a commercial FM radio station 55. As will be seen in following paragraphs, communication system 100 is specifically directed to the concept of transmitting data at a high data rate over a fading mobile commercial broadcast channel with high reliability of real-time data transmission. Although not restricted to any particular type of data transmission, communication system 100 is particularly adapted for use as an element of the Intelligent Vehicle Highway System, now in development, for transmission of traffic information to a plurality of mobile units 10. Specifically, system 100 provides traffic information at a relatively high data rate, 8 kilobits per second, in a fading channel environment. Thus, system 100 provides up-to-date traffic messages to a vehicle display unit 92, without undue delay, utilizing the existing infrastructure of the commercial FM system.

Figure 1:
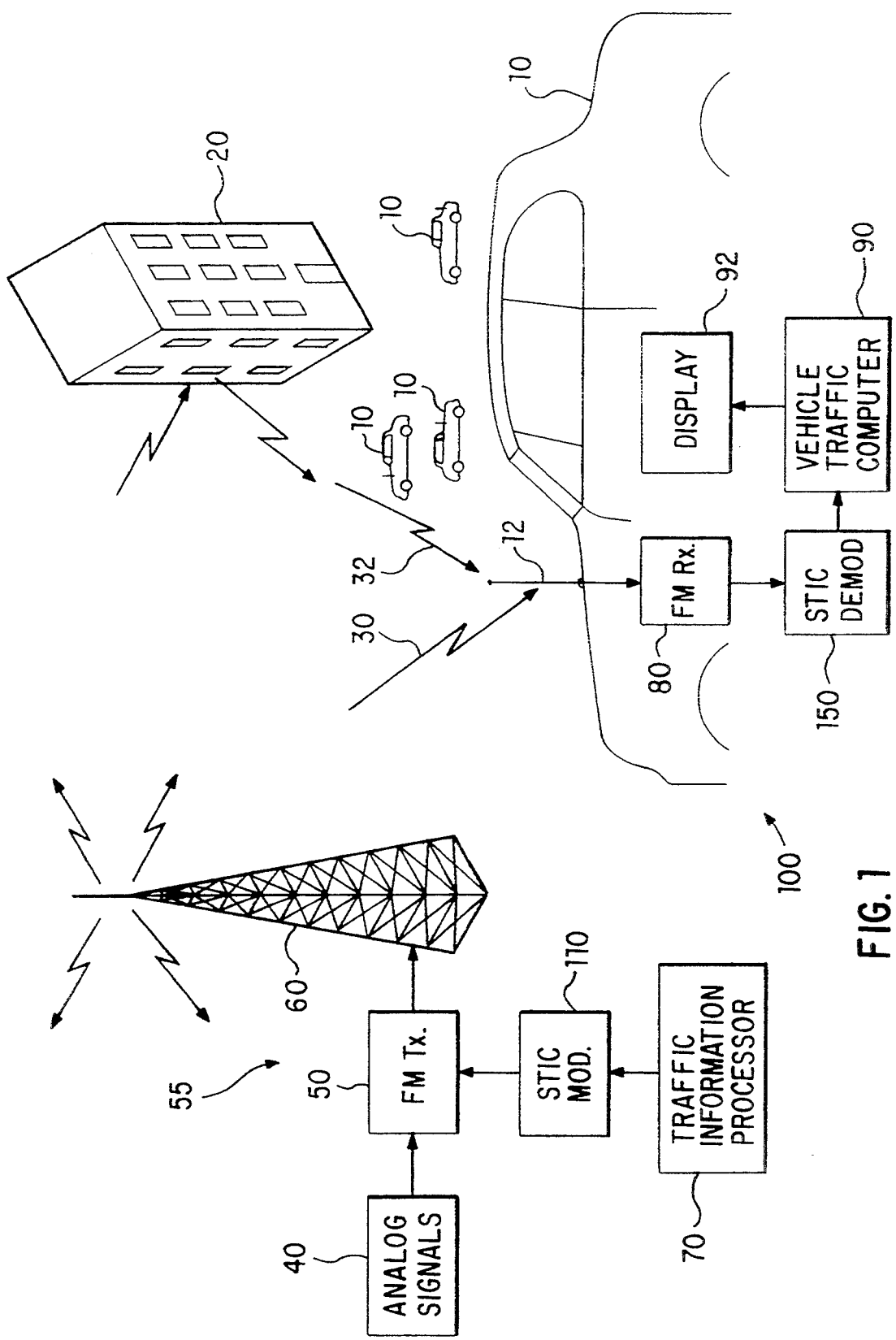
FIG. 1 is a block diagram of the overall communication system.

Referring now to FIG. 1, there is shown, a commercial FM broadcast station 55 wherein conventional program material in the form of analog audio signals 40 are supplied to the conventional FM transmitter 50, the output of transmitter 50 being coupled to the radio station's antenna 60. The traffic information is generated by a traffic information processor 70, processor 70 providing the traffic information in digital form to the subcarrier traffic information channel (STIC) modulator 110. The STIC modulator 110 modulates the digital information from processor 70 on a signal which is a subcarrier of the FM channel broadcast by the station 55. The output from the STIC modulator 110 is coupled to the FM transmitter 50 for modulation with the analog signals supplied thereto. Such modulation of subcarriers within the FM channel bandwidth of a commercial station is well known in the art for transmitting such material as stock quotes, subscription music broadcasts, foreign language broadcasts, and the like. Since such modulation of subcarriers is well known to those skilled in the art, a further description of the methods and apparatus associated therewith is not considered necessary to obtain a full and complete understanding of the instant invention by those skilled in the art.

Each of the mobile units 10 are defined by a motor vehicle having a conventional FM receiver 80 coupled to the vehicle's antenna 12 for reception of FM modulated radio frequency signals 30, 32. The FM receiver 80 demodulates the received radio frequency signal and couples the modulated subcarrier to the STIC demodulator 150. The STIC demodulator 150 recovers the digital traffic information from the modulated subcarrier and couples that data to the vehicle traffic computer 90. Such information processed by the vehicle traffic computer 90 may be displayed within the vehicle on a display 92 which is coupled to the computer 90, providing information as to traffic blockages and alternate routes available to the motorist.

Of particular importance to providing reliable data to each of the mobile units 10 is the ability of system 100 to provide data transmission with high integrity in the presence of fade. As shown diagrammatically, radio frequency signals may pass directly from the transmitting antenna 60 to the receiving antenna 12, and may be reflected from natural or manmade structures, such as building 20, to thereby be coupled to antenna 12 indirectly. The radio frequency signal 32 may be delayed in time with respect to the signal 30, or be shifted in phase as a result of the reflection from the building structure 20. Thus, the signals 30 and 32 may combine additively at antenna 12 or in the alternative, may combine such that one subtracts from the other. The reduction in signal level as a result of such subtraction, is commonly referred to as multi-path fade. As such multi-path signal combination is highly location sensitive, this presents a particular problem for communication with mobile units, whose position is continually changing. As will be seen in following paragraphs, the STIC modulator 110 and demodulator 150 have been designed to insure the reliability of data transmitted to the mobile units 10 and particularly to the use of a plurality of channel state bits having a unique predetermined sequence, transmitted with the digital data for determining a reliability factor in the demodulator 150.

Figure 2:
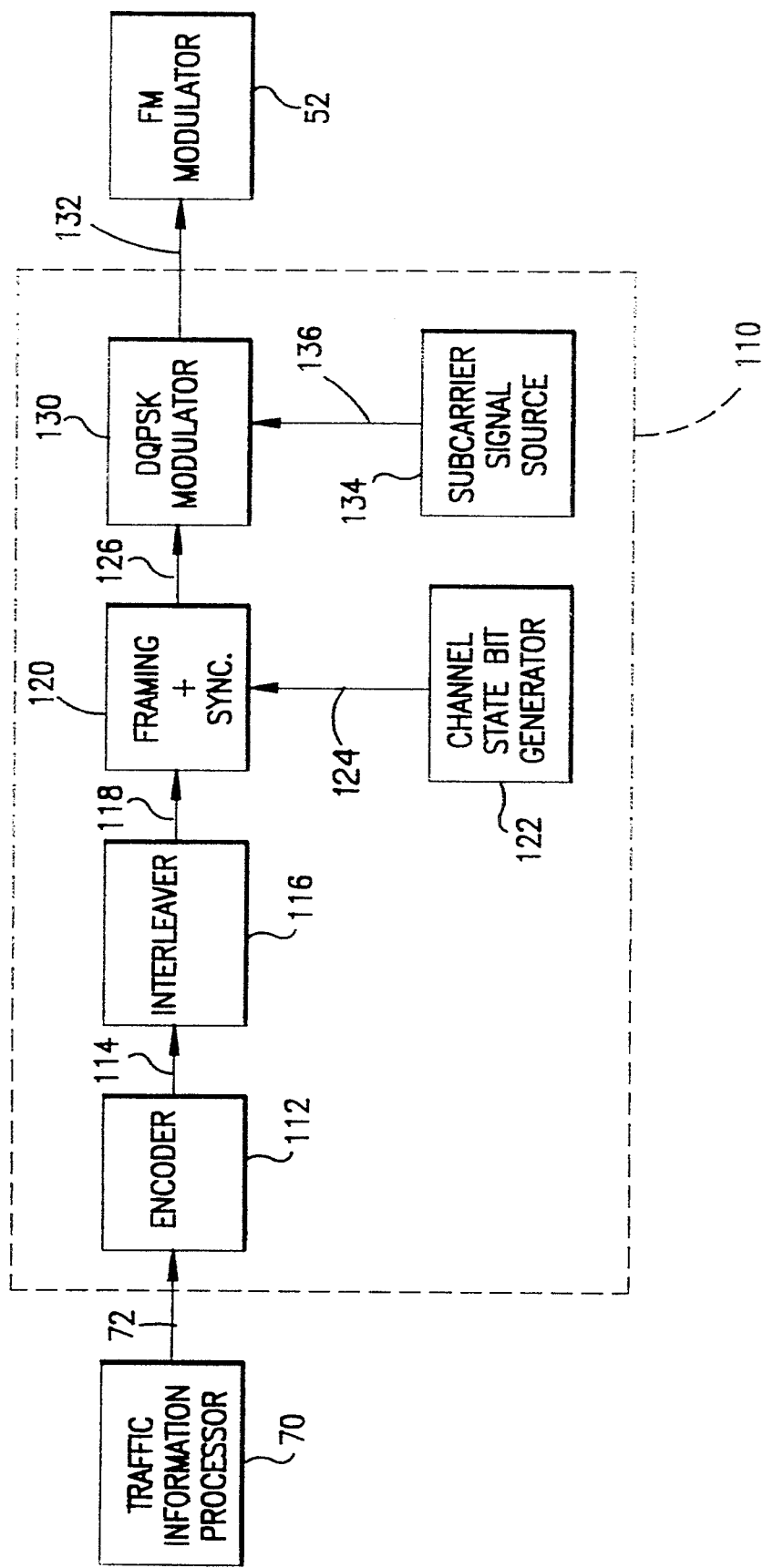
FIG. 2 is a block diagram of the subcarrier modulation portion of the communication system.

Referring now to FIG. 2, there is shown a block diagram of the STIC modulator 110. Digital data representing traffic information is coupled from the traffic information processor 70 to the encoder 112 by the data coupling line 72. Encoder 112 encodes the digital data received from processor 70 with a forward error correction code. Block codes are well known forward error correcting codes, and in particular, Reed Solomon codes are useful block error correcting codes which could be utilized in encoder 112. Convolutional codes are another class of forward error correcting codes which may be utilized in the invention of the subject Patent Application. In fact, in one working embodiment, a convolutional code having a rate approximating one-half and a constraint length approximating seven has been successfully utilized. The encoded data from encoder 112 is coupled to the interleaver 116 by the data coupling line 114. Interleaving is a well known means of altering the order of the bits of the encoded digital data such that consecutive bits thereof are separated by a predetermined number of bits, as will be further described in following paragraphs.

Although not shown in the drawings, data from the output of encoder 112 can be combined with a pseudo-random pattern of bits utilizing an Exclusive OR between encoder 112 and interleaver 116 to mitigate any interference resulting from intermodulation products caused by the mixing of the subcarrier and harmonics of the audio and pilot signals, which may fall within the audio band of the FM carrier bandwidth. By utilization of a pseudo-random signal, exclusive OR'd with the encoded data, such intermodulation products which may become audible, will sound like white noise, as opposed to the tone, whistles or howls which would otherwise result absent the pseudo-random combination of bits. At the receiver, an Exclusive OR is again utilized to combine an identical pseudo-random bit sequence with the recovered deinterleaved data signal to recover the encoded data.

Figure 3:
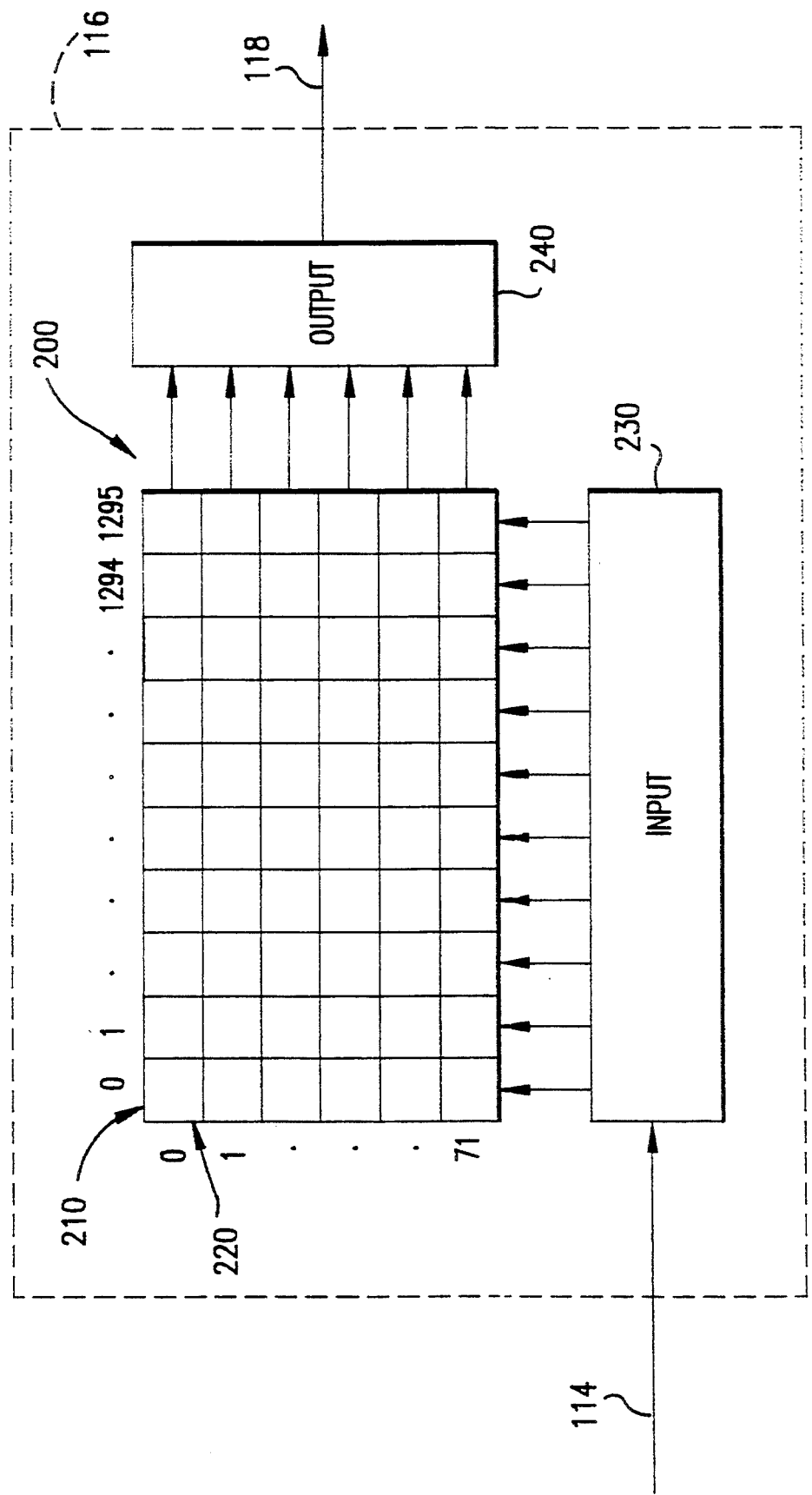
FIG. 3 is a block diagram of the interleaver of the communication system.

Referring now to FIG. 3, there is shown a diagrammatic representation of the interleaver 116. Interleaver 116 includes a memory array 200 for storage of the encoded data. Array 200 may include a memory structure having 1296 columns 210 and 72 rows 220. The encoded data is coupled to the memory input circuit 230 by the line 114, the input circuit 230 being designed to fill the memory array one column at a time. Thus, the first 72 bits fill column 0 and the 73rd bit is stored in location 0,1 (row 0 column 1). Subsequent to the array being filled with data, the data is read out one row at a time. Thus, the output circuit 240 reads all of the bits of row 0, bits 0–1295, and then proceeds to read all of the bits from row 1. Hence, the consecutive bits which were read in the first two rows of the first column, for example, are read out with 1295 intervening bits therebetween, since the input was done column by column and the output is done row by row. The data bits read from the memory array by the output circuit 240 are output on data line 118 for coupling to the framing and synchronization circuit 120, as shown in FIG. 2. Interleaving is a well known method for reducing the effects of burst errors, which may result in the fading channel environment. Use of the interleaving technique to provide a communications link which is less susceptible to burst errors, permits a forward error correction code to be utilized which may have a desirable error correction capability, but which would otherwise perform poorly in the presence of burst errors, such as a convolutional code.

Figure 6:
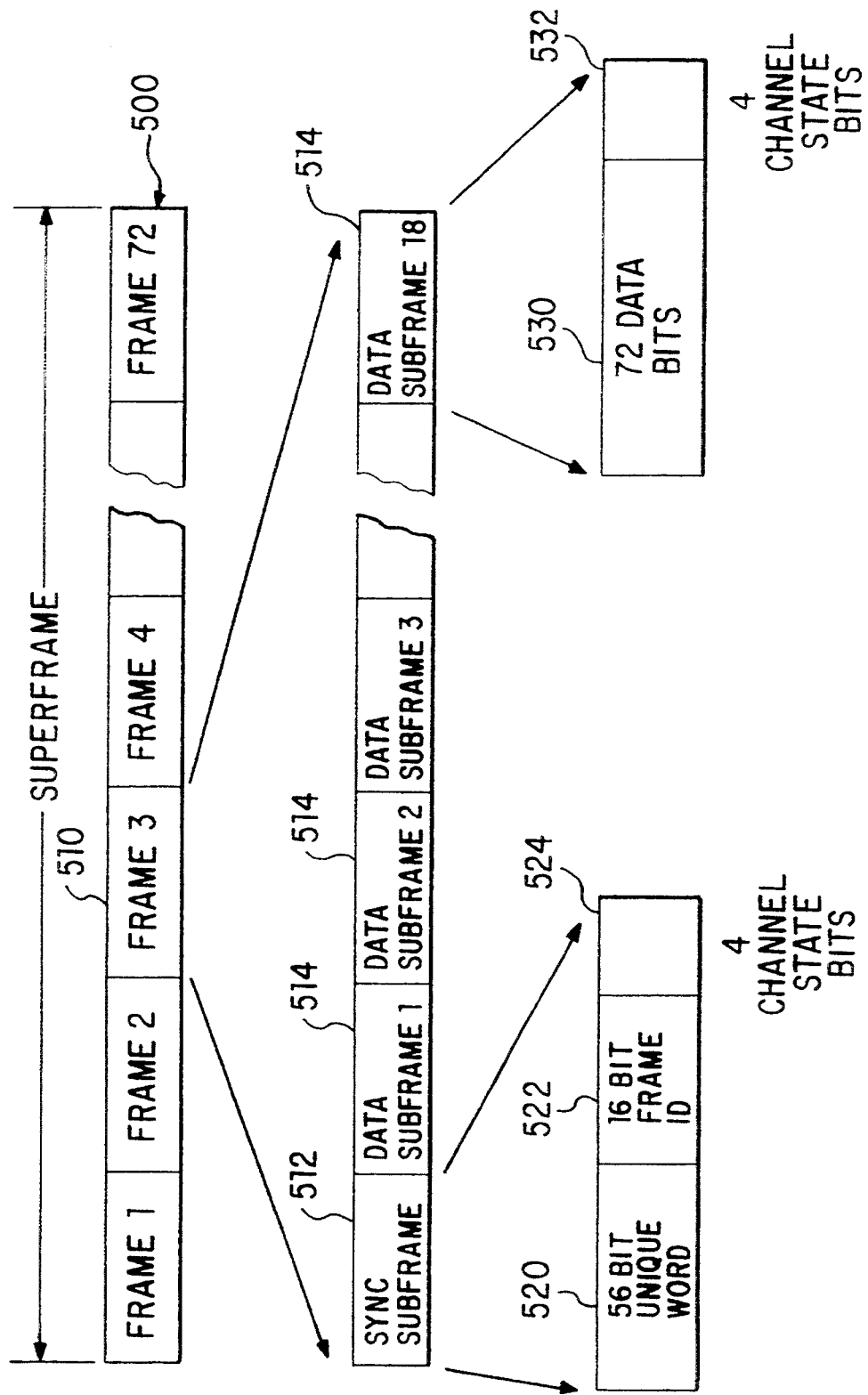

As shown in FIG. 2, the output of interleaver 116 is coupled to the framing and synchronization circuit 120 by the data link 118, the data link 118 providing the interleaved data bit stream from the memory output circuit 240. The framing and synchronization circuit 120 subdivides the interleaved encoded data into a plurality of data frames 510, each data frame 510 being subdivided into a plurality of data subframes 514, as shown in FIG. 6. Each frame 510 includes a synchronization subframe 512 and eighteen subframes 514. Each synchronization subframe 512, whose use is conventional in time division multiplex communications. Synchronization subframe 512 includes a 56-bit correlation word, a 16-bit frame identification word 522, and a field of four channel state bits 524. Each of the eighteen data subframes 514 are defined by a field 530 of 72 data bits and a field 532 of four channel state bits. Thus, every subframe (synchronization and data) includes a respective field 524, 532 of four channel state bits, whose function will be described in following paragraphs. Although not important to the inventive concept, an accumulation of 72 frames 510 define a single superframe 500, each superframe defining all of the data bits which fills the 72×1296 memory array 200.

Referring back to FIG. 2, the framing and synchronization circuit 120 is shown with an input for receiving the encoded data from interleaver 116 supplied by the data coupling line 118 and an input for receiving the data from the channel state bit generator 122 via the data coupling line 124. As previously described, four channel state bits are appended to the data and synchronization subframes 514, 512 of every frame 510 which forms each superframe 500. The channel state bits are a predetermined sequence of bits transmitted with the data as a means of assessing the reliability of the communications link. The channel state bit generator may be a hard wired logic circuit or read-only memory for providing the 4-bit sequence to each subframe formed in the framing and synchronization circuit 120.

The digital data message defined by the framed data from circuit 120 is coupled to a modulator 130 by the data coupling line 126. Many modulation schemes may be utilized for modulating the encoded data on a subcarrier of the FM broadcast channel. Various coherent, non-coherent or differentially coherent modulation schemes may be utilized. Such schemes as Trellis coded modulation, Gaussian filtered minimum shift keying, level shifted minimum shift keying, and differential quadrature phase shift keying are particularly relevant. However, differential quadrature phased shift keying (DQPSK) is preferred and has been successfully utilized in one working embodiment. Use of DQPSK modulation simplifies the demodulation process and produces a signal with less amplitude variation.

A subcarrier signal source 134 supplies the subcarrier signal to the modulator 130 by means of the coupling line 136. The subcarrier signal is centered around 76 kilohertz from the main carrier signal and has a nominal bandwidth approximating 16 kilohertz. The quadrature modulation thereby providing a transmission rate approximating 19,000 bits per second, which yields a user rate of approximately 8 kilobits per second. The modulated subcarrier is output from the modulator 130 to the FM modulator 52 by the coupling line 32, for modulation with the commercial programming, by conventional FM modulation techniques.

Figure 4:
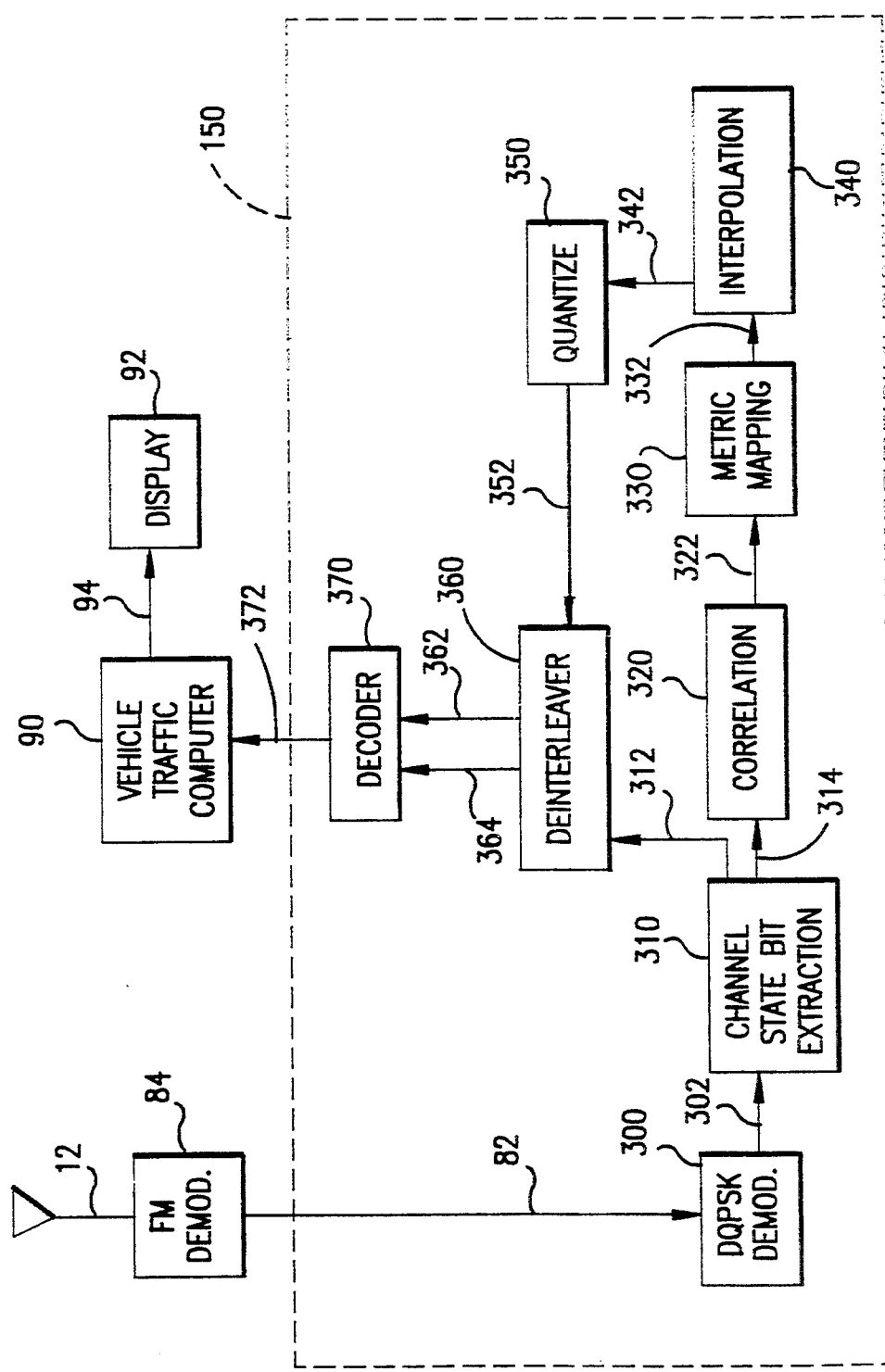
FIG. 4 is a block diagram of the subcarrier demodulation portion of the communication system.

Referring now to FIG. 4, there is shown, the STIC demodulator 150 coupled to the FM demodulator 84 of FM receiver 80. Signals received by the antenna 12 are coupled to the FM demodulator 84, the conventionally modulated program material being provided to the vehicle's speaker system (not shown), while the modulated subcarrier is output to the subcarrier demodulator 300 by means of the data link 82. Demodulator 300 provides the complement to the modulation scheme used by the modulator 130 of the STIC modulator 110. Thus, where differential quadrature phased shift keying is utilized to modulate the subcarrier, a DQPSK demodulator 300 is utilized within the STIC demodulator 150. The DQPSK demodulator includes a frequency signal source having a frequency approximating that of the subcarrier, as is well known in the demodulator art. The output of demodulator 300 is shown coupled to the channel state bit extraction circuit 310 by the data coupling line 302.

The channel state bit extraction circuit 310 separates the channel state bit field from each of the subframes 512, 514 of each frame 510. Using the synchronization fields 520, 522 to identify the data fields 530 and the channel state bits 524, 532, the sequence of channel state bits are extracted from each subframe and output on the data coupling line 314. The data fields 530 are output from the extraction circuit 310 to the deinterleaver circuit 360 by means of the data coupling line 312. The extracted channel state bits will be utilized to establish a reliability factor for each bit of the data, that factor then being utilized by the decoder for "soft38 decision making. Conventionally, soft decision algorithms for decoders, such as a Viterbi algorithm decoder, are based on the amplitude of the demodulated data bit being decoded. However, FM demodulators utilize limiters to remove any amplitude variation in the signal. Thus, there is no amplitude variation which can be utilized by the decoder for making a reliable decision as to the "value" of any bit being decoded.

To provide some other measure of the reliability of each bit of data, four channel state bits are added to each subframe. The channel state bits define a known sequence of bits provided at the transmitter, as has been previously described, and analyzed at the receiver to determine whether the bits received differ from that which was transmitted. The degree Of deviation in the channel bit sequence from that which was transmitted, provides a measure of the reliability of the communications channel. As will be described in following paragraphs, a data reliability factor is established for each bit of the transmitted data, that factor being utilized by the decoder to determine the state of each decoded bit.

Thus, the first step in the utilization of the channel state bits is accomplished in the correlation block 320, wherein the channel state bits are correlated with the known channel bit sequence which was utilized in the STIC modulator 110. The correlated channel state bits are next transformed into a metric, the output of correlation block 320 being coupled to the metric mapping block 330 by the coupling line 322. In block 330, the number of errors in each 4-bit sequence of channel bits is mapped to a particular metric selected to meet the maximum likelihood rule of the decoder, and scaled to provide convenient numerical values.

As previously discussed with respect to FIG. 6, and of particular importance, every subframe includes a channel bit field, including the synchronization subframe 512, therefore, a sequence of channel state bits precedes and follows every data field 530. Since the channel state information precedes and follows every data field, it is possible to interpolate across the data field, utilizing the channel state bits at each end thereof. Thus, from the metric mapping block 330, the data is coupled to the interpolation block 340 by the coupling line 332 for establishing an unquantized data reliability factor for each bit of every data field 530.

Subsequent to interpolation, the data reliability factors thereby established for each bit are coupled to a quantizer 350 by means of the coupling line 342. In block 350, the interpolated data is quantized into values which are usable by the decoder 370. In one working embodiment, the quantization yields nine possible values, four levels of "goodness" for each of the two binary states ("0" and "1") and a value designated as "Erase", the erasure value indicating that the true value of the bit is indeterminate. The quantized values for each bit are transmitted to the deinterleaver 360 by means of the data link 352, where they are stored with their associated data bit.

Figure 5:
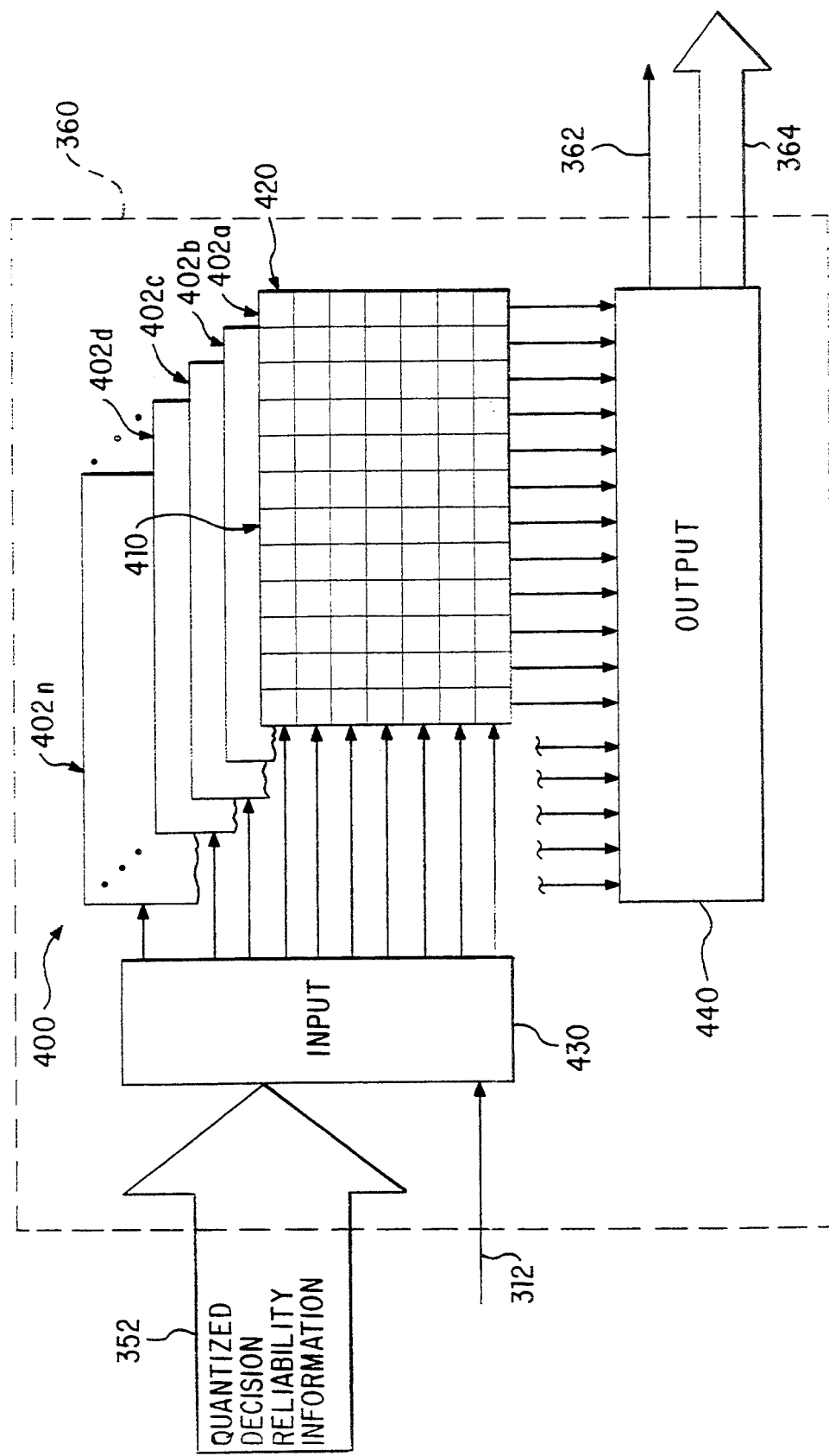
FIG. 5 is a block diagram of the deinterleaver of the communication system; and, FIG. 6 is a diagram of the frame structure of the digital message transmitted by the communication system.

Referring now to FIG. 5, there is shown a block diagram representation of the deinterleaver 360. Deinterleaver 360 includes a memory array 400 which may include a plurality of planes 402a–402n, arranged in parallel relationship. The particular architecture of memory array 400 is not important to the inventive concept, such may be organized in multiple planes, as illustrated, or in a single two dimensional array. If a single array is used, each data bit is associated with its corresponding data reliability factor by division of the array into blocks or use of consecutive memory locations for storage of such. In the memory structure shown, each of the memory planes 402 includes a plurality of rows 420 and a plurality of columns 410, with a memory storage cell located at the intersection of each of the respective rows and columns. Thus, as the channel state bits are extracted in block 310, the data is coupled to the memory input circuit 430 by means of the data link 352.

In order to reverse the separation of sequential bits carried out by the interleaver 116 of the STIC modulator 110, deinterleaver 360 must store and read out the data from the memory array in a manner opposite to that performed in the interleaver 116. Therefore, the data supplied to the input circuit 430 is stored row by row, with each row having 1296 storage locations, the same number as in interleaver 116, with 72 rows defining the array plane. The quantized decision reliability information associated with each bit of data is supplied to the input circuit 430 by the data coupling line 352. Each of the bits defining the quantized data are stored in parallel with the associated data bit, the quantized decision reliability information being stored row by row in the respective memory planes 402b–402n. The number of memory planes being a function of the number of bits representing the quantized data reliability factor. In one working embodiment, three bits are so utilized. Two bits are used to represent four discrete levels of "goodness" and one bit serves as an "Erase" flag.

When the memory array is filled, the array thereby containing the data supplied by a superframe 500, the output circuit 440 reads out the data. The data is read out column by column, thereby reordering the encoded data bits in their original sequence, as provided from the encoder 112 to interleaver 116. The encoded data bits, which were stored in the memory plane 402a, are output to the decoder 370 by data coupling line 362, while the quantized decision reliability information which was stored in the memory planes 402b–402n is output through the data link 364 to the decoder 370.

Decoder 370, as shown in FIG. 4, receives the data from deinterleaver 360 through the data link 362, and utilizes the quantized decision reliability information supplied on data link 364 to provide decoded data on the output line 372. Decoder 370 may be a Viterbi algorithm decoder. In one worrying embodiment, a Viterbi algorithm decoder was used with 3 bits representing the quantized decision reliability information, as previously described. The output from decoder 370 is coupled to the vehicle's traffic computer 90 by means of the data link 372. The vehicle traffic computer 90 processes the data supplied from decoder 370, and displays the relevant information to the user by means of a display 92, which is shown coupled to the computer by a data coupling line 94.

Thus, traffic information data can be communicated to mobile units at a high data rate utilizing a subcarrier of a commercial FM channel broadcast channel. The traffic information data is supplied to the STIC modulator 110 in the form of a plurality of consecutive bits from the traffic information processor 70. The received digital data is encoded with a forward error correcting code, by the encoder 112, which convolutionally codes the digital data. Subsequent to encoding the data, the sequence of encoded data bits are interleaved, the order of the bits being altered such that consecutive bits of the encoded digital data are separated by a predetermined number of bits. The interleaved encoded data is then divided into a plurality of data frames, each of the data frames 510 being formed by a plurality of data subframes 514. To each of the data frames 510 a synchronization subframe 512 is added. The division of the encoded digital data into data frames 510 includes the addition of a channel test word to each of the subframes 512, 514, the channel test word being defined by a predetermined sequence of a plurality of bits. Thus, each data field is preceded and followed by a channel test word.

The addition of the channel test word to the data subframes forms message subframes which are combined with a signal having a predetermined frequency, the frequency defining a subcarrier of the commercial FM channel. The subcarrier thereby being modulated with the plurality of message subframes using a differential quadrature phased shift keying modulator 130. The modulated subcarrier is supplied to the FM modulator 52 of the commercial FM radio station 55 for modulation on the FM carrier signal, the FM modulated signal being supplied to the transmitting antenna 60.

The frequency modulated carrier signal is received by at least one mobile receiving unit 10, wherein the radio frequency signal received at the receiver's antenna 12 is demodulated by the receiving unit's demodulator 84. The FM demodulator 84 supplies the modulated subcarrier to a differential quadrature phased shift keying demodulator 300 for demodulating the subcarrier to recover the message subframes. The message subframes are then processed to extract each of the plurality of data subframes from the plurality of message subframes to form a plurality of channel test words. The channel test words are compared with the known sequence of bits which were transmitted with the data to establish a data reliability factor. The comparison is in the form of a correlation between the plurality of consecutive bits extracted from the received data with the predetermined sequence known to have been transmitted. This correlation is then transformed into a metric, and the metric is interpolated across each consecutive pair of successive data subframes to form a non-quantized reliability factor for each bit of the data subframe. Following the interpolation step, the non-quantized data reliability factor is quantized to form a data reliability factor for each bit. The data reliability factor for each bit is stored in a memory array of a deinterleaver 360 in correspondence with its associated data bit.

The data is decoded by deinterleaving the data bits along with their associated quantized data reliability factors, the deinterleaving process reordering the encoded data by removal of the predetermined number of intervening bits which previously separated the original consecutive bits of the encoded data. Each of the now sequential encoded data bits being transmitted to the decoder 370 with an associated data reliability factor, utilized in the "soft" decision process of the decoder, which is a Viterbi algorithm decoder. Lastly, the now decoded data is transmitted to a utilization device, such as the vehicle traffic computer 90, which may include a display 92 for presentation of the data to a user.

The communication system 100 and the method defined thereby for transmitting data on a subcarrier of a commercial FM radio broadcast channel, provides for high capacity, robust and upgradeable mobile radio frequency data transmission particularly useful for providing traffic information to motor vehicles. Although the commercial FM broadcast channel is subject to multipath fading, the concatenation of elements which defines system 100 provides a means for reducing the system's susceptibility to transmission errors under these fading conditions, as well as other interference conditions. System 100 thereby providing a highly reliable communication link without the requirement for extensive increases in highway infrastructure to provide traffic information directly to vehicles.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. A communication system using a subcarrier within a commercial FM channel bandwidth for transmitting data to mobile receivers, comprising:

means four generating a signal having a predetermined frequency defining a subcarrier signal of an FM broadcast channel for a commercial FM broadcast station;

coding means for encoding digital data received at an input thereof with an error correcting code, said digital data being defined by a plurality of consecutive bits;

means coupled to an output of said coding means for adding a plurality of bits in a predetermined first sequence to said encoded digital data to form a digital message;

subcarrier modulation means having (1) a first input coupled to an output of said means for adding said plurality of bits for receiving said digital message therefrom, and (2) a second input coupled to said generating means for modulating said digital message on said subcarrier signal;

means for coupling said modulated subcarrier signal to an FM transmitter of said commercial FM broadcast station for frequency modulation of said modulated subcarrier signal on a carrier signal of said FM broadcast channel;

means for receiving said FM broadcast channel transmitted by said commercial FM broadcast station, said receiving means including FM demodulation means for recovering said modulated subcarrier signal from said modulated carrier signal;

subcarrier demodulation means coupled to said carrier demodulation means for recovering said digital message from said modulated subcarrier signal;

extraction means coupled to said subcarrier demodulation means for extracting said encoded digital data from said digital message and forming a second sequence of bits therefrom;

decoding means coupled to said extraction means for (1) comparing said second sequence of bits with said predetermined first sequence of bits for establishing a data reliability factor, and (2) decoding said encoded digital data in correspondence with said data reliability factor for providing said digital data to an output thereof; and, utilization means coupled to said output of said decoding means for receiving said digital data therefrom and operating thereon.

2. The communication system as recited in claim 1 where said subcarrier modulation means is a differential quadrature phase shift keying modulator.

3. The communication system as recited in claim 1 where said subcarrier demodulation means is a differential quadrature phase shift keying demodulator.

4. The communication system as recited in claim 1 where said coding means includes (1) means for convolutionally coding said digital data, and (2) interleaving means coupled to an output of said convolutional coding means for altering an order of bits of said encoded digital data such that consecutive bits of said encoded digital data are separated by a predetermined number of bits.

5. The communication system as recited in claim 4 where said interleaving means includes (1) a first memory array having a plurality of rows and columns (2) means for writing said encoded digital data in said first memory array column-by-column coupled to said output of said convolutional coding means, and (3) means for reading said encoded digital data from said first memory array row-by-row.

6. The communication system as recited in claim 4 where said means for adding said plurality of bits includes framing means for forming a plurality of data frames from said encoded digital data, each of said plurality of said data frames being formed by a plurality of data subframes, said predetermined first sequence of bits being added to each of said plurality of data subframes.

7. The communication system as recited in claim 6 where said decoding means includes means for forming a correlation between said second sequence of bits and said predetermined first sequence of bits coupled to a first output of said extraction means.

8. The communication system as recited in claim 7 where said decoding means includes transformation means coupled to an output of said correlation means for transforming said correlation into a metric.

9. The communication system as recited in claim 8 where said decoding means includes interpolation means coupled to an output of said transformation means for interpolating said metric across a pair of successive data subframes.

10. The communication system as recited in claim 9 where said decoding means includes quantization means coupled to an output of said interpolation means for forming said data reliability factor for each bit of said encoded digital data.

11. The communication system as recited in claim 10 where said data reliability factor is formed by a plurality of bits.

12. The communication system as recited in claim 10 where said decoding means includes deinterleaving means having a first input coupled to a second output of said extraction means and a second input coupled to an output of said quantization means for removing said predetermined number of bits from between consecutive bits of said encoded digital data and associating a respective data reliability factor with each bit thereof.

13. The communication system as recited in claim 12 where said deinterleaving means includes (1) a second memory array having a plurality of rows and columns, (2) writing means having a first input coupled to a second output of said extraction means, a second input coupled to an output of said quantization means, and an output coupled to said second memory array for storing said encoded digital data and said associated data reliability factors for each bit thereof row-by-row, and (3) means for reading said encoded digital data and said associated data reliability factors for each bit thereof from said second memory array column-by-column.

14. The communication system as recited in claim 12 where said decoding means includes a Viterbi-type decoder coupled to an output of said deinterleaving means for recovering each bit of said digital data from said encoded digital data in correspondence with said associated data reliability factor.

15. The communication system as recited in claim 14 where said utilization means includes a processor coupled to an output of said Viterbi-type decoder for accumulating said digital data and displaying representations thereof.

16. A communication system having a high data rate using a subcarrier within a commercial FM channel bandwidth, comprising:
   means for generating a signal having a predetermined frequency defining a subcarrier signal of an FM broadcast channel for a commercial FM broadcast station;
   coding means for encoding digital data received at an input thereof with an error correcting code, said digital data being defined by a plurality of consecutive bits;
   interleaving means coupled to an output of said coding means for altering an order of bits of said encoded digital data such that consecutive bits of said encoded digital data are separated by a predetermined number of bits;
   means coupled to an output of said interleaving means for adding a plurality of bits in a predetermined first sequence to said encoded digital data to form a digital message;
   subcarrier modulation means having (1) a first input coupled roan output of said means for adding said plurality of bits for receiving said digital message therefrom, and (2) a second input coupled to said generating means for modulating said digital message on said subcarrier signal;
   means for coupling said modulated subcarrier signal to an FM transmitter of said commercial FM broadcast station for frequency modulation of said modulated subcarrier signal on a carrier signal of said FM broadcast channel;
   means for receiving said FM broadcast channel transmitted by said commercial FM broadcast station, said receiving means including FM demodulation means for recovering said modulated subcarrier signal from said modulated carrier signal;
   subcarrier demodulation means coupled to said carrier demodulation means for recovering said digital message from said modulated subcarrier signal;
   extraction means coupled to said subcarrier demodulation means for extracting said encoded digital data from said digital message and forming a second sequence of bits therefrom;
   decoding means coupled to said extraction means for (1) comparing said second sequence of bits with said predetermined first sequence of bits for establishing a data reliability factor for each bit of said encoded digital data, and (2) decoding said encoded digital data in correspondence with said data reliability factor for providing said digital data to an output thereof, said decoding means including deinterleaving means having an input coupled to an output of said extraction means for removing said predetermined number of bits from between consecutive bits of said encoded digital data and associating a respective data reliability factor with each bit thereof; and, utilization means coupled to said output of said decoding means for receiving said digital data therefrom and operating thereon.

17. The communication system as recited in claim 16 where said interleaving means includes (1) a first memory array having a plurality of rows and columns (2) means for writing said encoded digital data in said first memory array column-by-column, and (3) means for reading said encoded digital data from said first memory array row-by-row.

18. The communication system as recited in claim 17 where said means for adding said plurality of bits includes framing means coupled to said means for reading encoded digital data for forming a plurality of data frames therefrom, each of said plurality of said data frames being formed by a plurality of data subframes, said predetermined first sequence of bits being added to each of said plurality of data subframes.

19. The communication system as recited in claim 18 where said decoding means includes means for forming a correlation between said second sequence of bits and said predetermined first sequence of bits coupled to a first output of said extraction means.

20. The communication system as recited in claim 19 where said decoding means includes transformation means coupled to an output of said correlation means for transforming said correlation into a metric.

21. The communication system as recited in claim 20 where said decoding means includes interpolation means coupled to an output of said transformation means for interpolating said metric across a pair of successive data subframes.

22. The communication system as recited in claim 21 where said decoding means includes quantization means coupled to an output of said interpolation means for forming said data reliability factor for each bit of said encoded digital data.

23. The communication system as recited in claim 22 where said data reliability factor is formed by a plurality of bits.

24. The communication system as recited in claim 21 where said decoding means includes a Viterbi-type decoder coupled to an output of said deinterleaving means for recovering each bit of said digital data from said encoded digital data in correspondence with said associated data reliability factor.

25. The communication system as recited in claim 24 where said utilization means includes a processor coupled to an output of said Viterbi-type decoder for accumulating said digital data and displaying representations thereof.

26. A method of communicating data at a high data rate using a subcarrier within a commercial FM channel bandwidth of a commercial FM radio station, comprising the steps of:
   a. receiving digital data defined by a plurality of consecutive bits from a data source;
   b. encoding said digital data with an error correcting code;
   c. dividing said encoded digital data into a plurality of data frames, each of said data frames being formed by a plurality of data subframes;
   d. adding a first channel test word to each of said plurality of data subframes to form a plurality of corresponding message subframes, said first channel test word being defined by a plurality of bits in a predetermined sequence;
   e. providing a first signal having a predetermined frequency to define said subcarrier;
   f. modulating said subcarrier with said plurality of message subframes;
   g. providing a second signal having a predetermined frequency defining a carrier signal for a commercial FM channel of said commercial FM radio station;
   h. frequency modulating said modulated subcarrier on said carrier signal, said frequency modulated carrier signal being coupled to an antenna for broadcast to a plurality of mobile receiving systems;
   i. receiving said frequency modulated carrier signal by at least one of said mobile receiving systems;
   j. demodulating said received frequency modulated carrier signal to recover said modulated subcarrier;
   k. demodulating said subcarrier to recover said message subframes;
   l. extracting each of said plurality of data subframes from said plurality of message subframes and forming a plurality of second channel test words, each of said second channel test words being formed by a plurality of consecutive bits;
   m. comparing said plurality of consecutive bits of each of said second channel test words with said predetermined sequence of bits of said first channel test word to establish a data reliability factor for each bit of each of said plurality of extracted data subframes;
   n. sequentially decoding said digital data from each of said extracted data subframes in correspondence with said data reliability factor; and,
   o. transmitting said decoded digital data to a utilization device.

27. The method of communicating as recited in claim 26 where said step of encoding includes the step of convolutionally coding said digital data.

28. The method of communicating as recited in claim 26 where said step of dividing said encoded data includes the step of adding a synchronization subframe to each of said data frames.

29. The method of communicating as recited in claim 26 where said step of modulating said subcarrier includes the step of modulating said subcarrier using a differential quadrature phase shift keying modulator.

30. The method of communicating as recited in claim 26 where said step of demodulating said subcarrier includes the step of demodulating said subcarrier using a differential quadrature phase shift keying demodulator.

31. The method of communicating as recited in claim 26 where said step of encoding is followed by the step of interleaving said encoded digital data.

32. The method of communicating as recited in claim 31 where said step of comparing includes the steps of:
   a. forming a correlation between said plurality of consecutive bits of each of said second channel test words with said predetermined sequence of bits of said first channel test word;
   b. transforming said correlation into a metric;
   c. interpolating said metric across each consecutive pair of successive data subframes to form a nonquantized data reliability factor for each bit of said data subframe; and, d. quantizing said non-quantized data reliability factor for each bit of said data subframe to form said data reliability factor for each bit thereof.

33. The method of communicating as recited in claim 32 where said step of decoding is preceded by the steps of:

a. deinterleaving said encoded digital data; and, b. associating each bit of said digital data with a respective data reliability factor.

34. The method of communicating as recited in claim 33 where said step of decoding includes the step of decoding said encoded digital data with a Viterbi-type decoder.

* * * * *